April 21, 1964   E. P. LARSH   3,130,075
BALANCING APPARATUS
Filed May 18, 1960   4 Sheets-Sheet 1
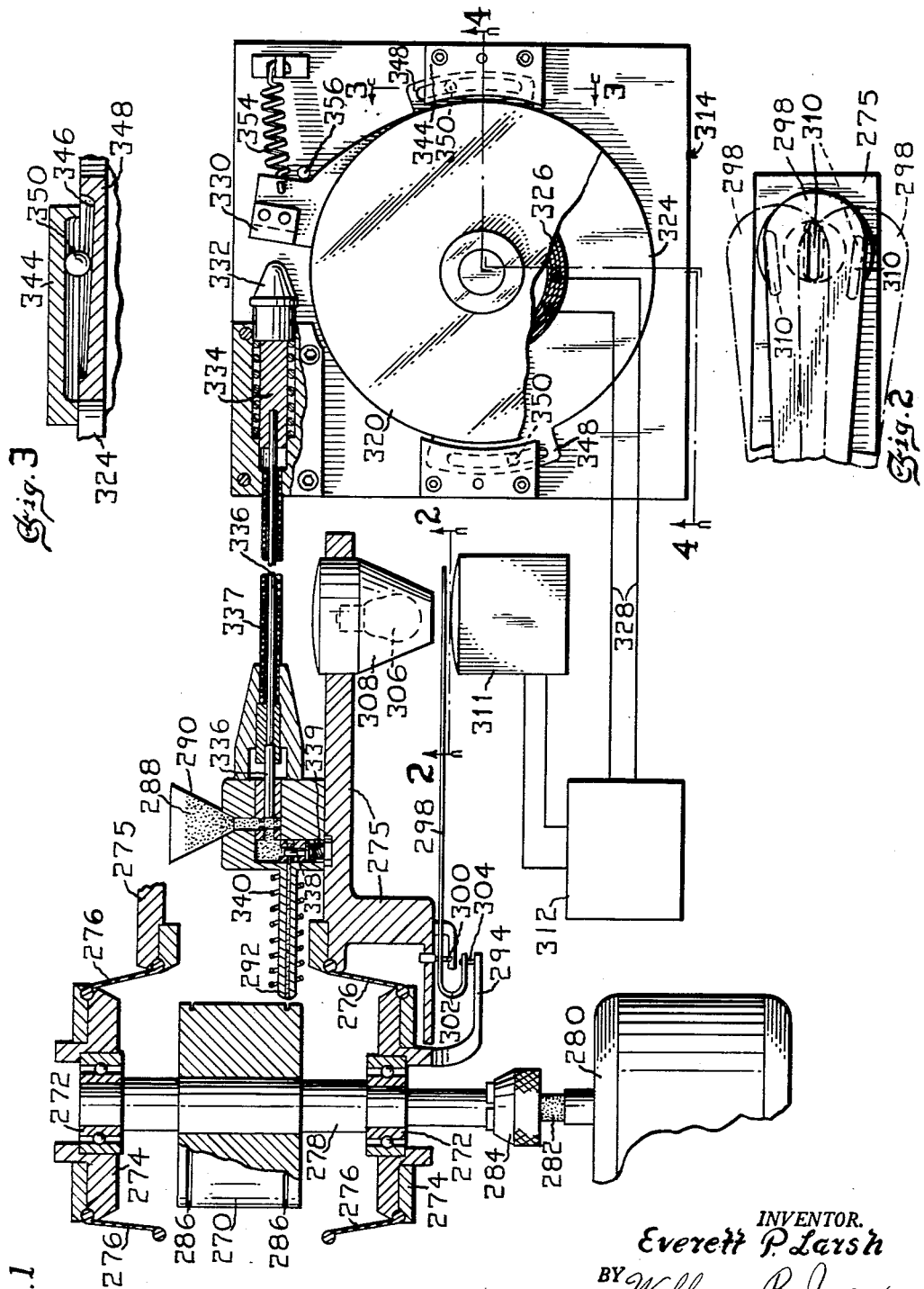
INVENTOR.
Everett P. Larsh
BY William R. Jacox INVENTOR.
Everett P. Larsh
BY William R. Jacox

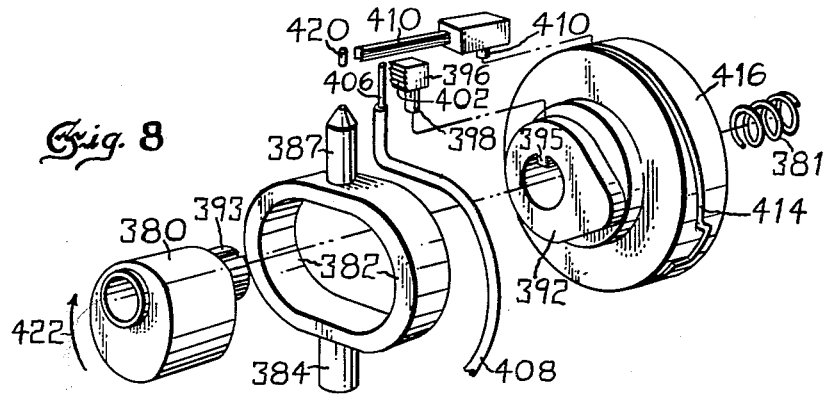
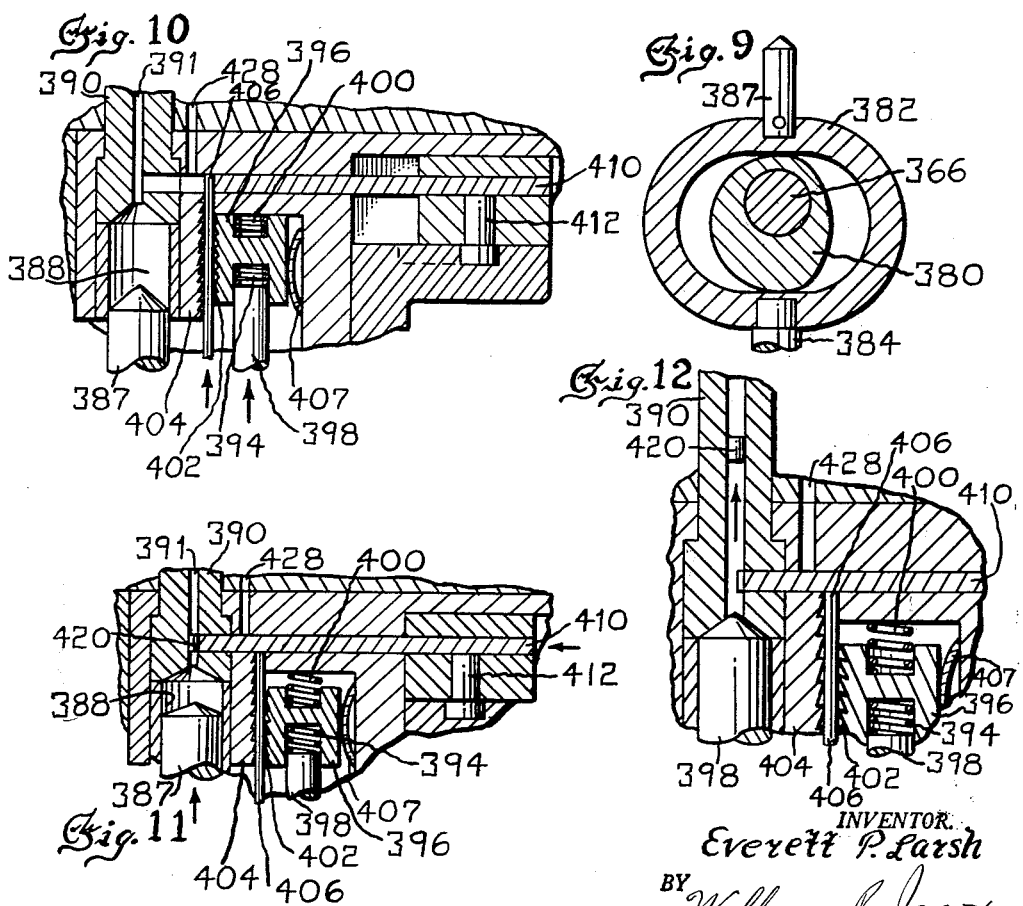

April 21, 1964  E. P. LARSH  3,130,075
BALANCING APPARATUS
Filed May 18, 1960  4 Sheets-Sheet 4

INVENTOR.
Everett P. Larsh
BY William A. Jacox

United States Patent Office 3,130,075
Patented Apr. 21, 1964

3,130,075
BALANCING APPARATUS
Everett P. Larsh, Montgomery County, Ohio
(124 E. Monument Ave., Dayton 2, Ohio)
Filed May 18, 1960, Ser. No. 29,984
11 Claims. (Cl. 118—8)

This invention relates to balancing apparatus. The invention relates more particularly to automatically operable balancing apparatus which provides dynamic balance to a rotatable member during rotation of the rotatable member. This application is a continuation-in-part of my co-pending application Serial No. 697,586, filed November 20, 1957, now Patent No. 2,937,613.

In the past it has been customary in the balancing of a rotatable member to use equipment or apparatus which determines the magnitude of unbalance and which also determines the location of the portion or portions of the rotating member which require weight change for improving the balance of the member. Such equipment has, of necessity, been rather involved and costly. Furthermore, with the use of such equipment it has been necessary to stop the rotating member and to apply or remove weight material in accordance with indications obtained while the member was rotating. Thus, in the past, balancing apparatus has only indicated the portions or portion of a rotating member which required weight correction. The actual weight correction has been carried out only with the member in a static condition. Obviously, a procedure of this type may be very time consuming, often requiring frequent starting and stopping of the rotating member. Furthermore, such a procedure requires manual operation in the weight changing process. Thus, such procedures are objectionable.

An object of this invention is to provide balancing apparatus which is capable of automatically balancing a rotating member so that no manual operation is required. Such a machine thus may be applied to an automatically operating production system.

Another object of this invention is to provide balancing apparatus which is capable of completely balancing a rotatable member to any desired degree of balance during rotation of the rotatable member.

Another object of this invention is to provide a dynamic balancing machine which eliminates the need for an instrument which directly locates a portion requiring weight correction.

Another object of this invention is to provide a dynamic balancing machine which eliminates the need for any instrument which measures the magnitude of the unbalanced condition.

Another object of this invention is to provide an apparatus which corrects an unbalance of a rotatable member during rotation thereof and which has means by which the rate of correction may be controlled.

Another object of this invention is to provide such an apparatus which has means by which the degree of balance obtained is easily and readily adjusted.

Another object of this invention is to provide an automatic balancing machine which has a minimum number of parts and has extreme simplicity.

Another object of this invention is to provide such an automatically operating balancing apparatus which is capable of providing dynamic balance to a rotating member which may be of any size or shape.

Another object of this invention is to provide an automatic balancing machine which is capable of balancing a rotating member which is revolving at any rate.

Another object of this invention is to provide a balancing machine which is capable of balancing any rotatable member by adding weight thereto or by subtracting weight therefrom during rotation thereof for balancing thereof.

Another object of this invention is to provide a balancing machine which is capable of providing dynamic balance to a rotating member by the use of any one of several types of weight changing devices or instruments.

Other objects and advantages reside in the construction of parts, the combination thereof, the method of manufacture, and the mode of operation, as will become more apparent from the following description.

In the drawings,

FIGURE 1 is a schematic view, with parts broken away and shown in section, disclosing a balancing apparatus of this invention.

FIGURE 2 is a sectional view taken substantially on line 2—2 of FIGURE 1.

FIGURE 3 is a sectional view taken substantially on line 3—3 of FIGURE 1.

FIGURE 8 is an exploded perspective view showing elements of the apparatus of FIGURE 7.

FIGURE 9 is a partially sectional view taken substantially on line 9—9 of FIGURE 7.

FIGURE 10 is a enlarged fragmentary sectional view of a portion of the apparatus of FIGURE 7, showing the elements thereof in a position of operation.

FIGURE 11 is an enlarged fragmentary sectional view, somewhat similar to FIGURE 10 and showing the elements in another position of operation.

FIGURE 12 is an enlarged fragmentary sectional view somewhat similar to FIGURES 10 and 11 but on a larger scale and showing elements of the apparatus in another position of operation.

Figures 4, 5, 6, 7:
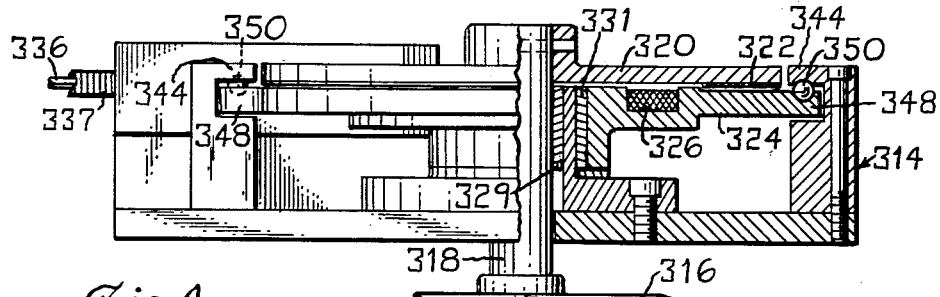
FIGURE 4 is a sectional view taken substantially on line 4—4 of FIGURE 1.
FIGURE 5 is an enlarged fragmentary view of a portion of the apparatus shown in FIGURE 1.
FIGURE 6 is an enlarged fragmentary view showing a portion of the apparatus of FIGURE 5, drawn in a somewhat larger scale and showing the elements thereof in a position of operation.
FIGURE 7 is a sectional view showing another modification of a portion of a balancing apparatus of this invention.

Referring to the drawings in detail, FIGURE 1 shows a balancing apparatus of this invention. A rotor 270 to be balanced is retained by bearing members 272. The bearing members 272 are supported by carrier members 274 which are resiliently connected to rigid support structure 275 by resilient members 276. The rotor 270 is carried by a shaft 278 which is rotated by a motor 280, through a resilient coupler 282 to which is attached a clamping member 284. The rotor 270 may be provided with annular grooves or slots 286 for the receipt of balancing material 288 which is carried by a hopper 290. The balancing material 288 is shown as being in a molten or fused condition and is discharged into one of the grooves 286 of the rotor 270 through a barrel 292.

Detector or sensing means include an arm 294 which is rigidly attached to one of the carrier members 274 so that the arm 294 moves with lateral movement of the lower bearing 272. An elongate finger member 298 is pivotally carried by the support structure 275 by means of a pivot pin 300. The finger 298 has an arcuate portion 302 terminating adjacent the arm 294. The finger 298 is pivotally attached to the arm 294 by means of a pin 304.

The support structure 275 also carries a light source 306 within a hood 308. The light source 306 is adapted to provide a beam of light which normally passes through a slot 310 of the finger 298 into a photoelectric receiver 311. The photoelectric receiver 311 is connected by means of a control unit 312 to an actuator mechanism 314.

The actuator unit 314 comprises an electric motor 316 or any other suitable motor means which during operation of the balancer apparatus constantly rotates a shaft 318 which has a drive disc 320 rigidly attached thereto for rotation therewith, as best shown in FIGURE 4. The lower surface of the disc 320 is provided with a frictional material 322. Directly below the drive disc 320 and normally spaced therefrom is a clutch plate 324 which is provided with a magnetizing coil 326 which is directly connected to the control unit 312 by means of conductor members 328, as shown in FIGURE 1. The shaft 318 is journaled in a bearing 329 and the plate 324 rotates about a bearing member 331, as shown in FIGURE 4. The clutch plate 324 is magnetically drawn into engagement with the drive disc 320 when the coil 326 is energized.

Thus, when the coil 326 is energized, the clutch plate 324 rotates with the drive disc 320. However, the clutch plate 324 is adapted to rotate only a small portion of a revolution so that an impact member 330, which is attached to the clutch plate 324, as shown in FIGURE 1, engages a head 332 of a plunger 334. When the plunger 334 is moved to the left, as shown in FIGURES 1, 5, and 6, a ram rod 336 within a tube 337 is forced to the left and causes a quantity of the material 288 to be ejected through the barrel 292.

This ejection operation is best illustrated by FIGURE 6 which shows that when the ram rod 336 moves to the left a quantity of the material 288 forces a plunger 338 downwardly and also causes increased pressure within the barrel 292. The plunger 338 is biased by a spring 339. A heater cable 340 is shown encircling the barrel 292 to maintain heat within the barrel 292 to maintain the material 288 in a molten state. When the material 288 is ejected from the barrel 292, as shown in FIGURE 6, it is forced at a high velocity into one of the slots 286 of the rotor 270 for the balancing thereof. However, the material ejected from the barrel 292 may be applied to any portion of a rotating member to be balanced and need not necessarily be applied to a groove.

It is to be understood that the sensing or detector apparatus, which includes the pivotally movable finger 298, causes the control unit 312 to operate the magnetic clutch 324 at any instant that the finger 298 pivotally moves to such an extent that the light beam from the light source 306 to the receiver 311 is broken, as shown in dotted lines in FIGURE 2. In other words, pivotal movement of the finger 298 beyond a given amount, as a result of out of balance of the rotor 270, causes actuation of the control unit 312 which results in magnetization of the clutch plate 324 by means of the coil 326.

The sensing apparatus operates when the rotor 270 is out of balance above a given predetermined amount. Unbalance of the rotor 270 causes lateral movement of the rotor 270 during rotation thereof. The resilient members 276 permit such lateral movement of the rotor 270. The barrel 292 is so positioned with respect to the arm 294 that upon lateral movement of the rotor 270 above the given amount, the barrel 292 discharges weight material 288 into the groove 286 at the proper instant to cause the weight material to be applied to the proper circumferential position on the rotor to add weight to a lighter portion of the rotor 270 so that better balance of the rotor 270 is obtained. As the rotor 270 rotates the detector or sensing means continues to actuate discharge of weight material until the rotor 270 is balanced to a desired degree. The sensing means may cause discharge of weight material at the proper instant upon each revolution of the rotor 270 or upon every other revolution, or the like, depending upon the rate of rotation of the rotor 270.

As shown in FIGURES 1, 3, and 4, the upper surface of the actuator mechanism unit 314 is provided with a cam plate 344 which cooperates with a cam surface 346 of an ear 348 which is attached to the clutch plate 324 and extends under the cam plate 344. A ball member 350 is disposed between the cam plate 344 and the ear 348 and causes the clutch plate 324 to be disengaged from the drive disc 320 an instant before the impact member 330 engages the head 332 of the plunger 334. Thus, the impact member 330 is thrown at a high rate of speed against the head 332 as the clutch plate 324 is disengaged from the drive disc 320. The control unit 312 causes the coil 326 to be energized for only a very short period of time upon each signal received from the receiver unit 311. Thus, the coil 326 is deenergized at substantially the same instant that the balls 350 cause separation of the clutch plate 324 from the disc 320. A spring member 354 returns the clutch plate 324 to its normal position as the impact member 330 normally rests against a stop pin 356, as shown in FIGURE 1.

It is to be understood that a plurality of units such as shown in FIGURE 1 can be used for balancing a rotor such as the rotor 270.

FIGURE 7 shows another modification in a weight changer mechanism of a balancing apparatus of this invention. FIGURE 7 shows an ejector mechanism 360 which comprises an electric motor 361 provided with a rotor 362 and a stator 364. The rotor 362 is supported by a shaft 366 firmly attached thereto for rotation therewith. Rigidly attached to the shaft 366 is a fly wheel 368 having an engagement plate 370.

Movable into engagement with the engagement plate 370 is a clutch plate 372. The clutch plate 372 is normally retained in fixed position against a brake plate 374 by means of a normally energized magnetizing coil 376 which is controlled by any suitable control mechanism of a detector unit. A cam member 380 is rigidly attached to the clutch plate 372 for rotation therewith. The cam member 380 is rotatable upon the shaft 366 so that the cam member 380 is stationary while the clutch plate 372 is magnetically retained in engagement with the brake member 374. The cam member 380 is resiliently urged to move axially toward the fly wheel 368 by means of a spring 381.

Rotatable about the cam member 380 is a yoke 382 as shown in FIGURE 9. Rigidly attached to the lower portion of the yoke 382 is a guide pin 384 which is slidably movable within a sleeve 386. Thus, with rotation of the cam 380 to the yoke 382 is reciprocally moved. Firmly attached to the upper portion of the yoke 382 is a plunger 387. The cam member 380 and the yoke 382 serve as connector means between the clutch plate 372 and the plunger 387. The plunger 387 is slidably in sealed engagement with the walls of a housing which forms a chamber 388. The chamber 388 serves as a fluid container and communicates with a passage 391 of a barrel 390.

The cam 380 has a reduced cylindrical portion 393 provided with a groove which receives an internal lug 395 of a cam 392 as shown in FIGURE 8. The cam 380 is thus axially movable with respect to the cam 392 but the cam 392 rotates with the cam 380. A spring member 394 carried by a block 396 urges a pin 398 into engagement with the cam 392. A spring 400 resiliently engages the block 396 urging the block 396 toward the pin 398.

The left hand portion of the block 396, as shown in FIGURES 10, 11, and 12 is provided with clamping teeth 402 which cooperate with a clamping jaw 404. A strip of material such as any suitable wire or the like 406 is shown disposed between the clamping teeth 402 and clamping jaw 404. A disc spring 407 urges the block 396 toward the jaw 404 for clamping the wire 406. The wire 406 may be any suitable type of weight material and may preferably be copper coated. The wire 406 extends through a tube 408 which enters the ejector mechanism 360 at the lower portion thereof, as shown in FIGURE 7.

Injector means in the form of a plunger 410 is slidably reciprocally movable normal to the wire 406. The left hand portion of the plunger 410 as shown in FIGURES 7, 8, 10, and 11, has an operator pin 412 firmly attached thereto. The operator pin 412 is slidably movable within a channel 414 of a drum 416 which is rigidly attached to the cam 392 and rotatable therewith.

FIGURE 7 shows elements of the actuator in normal positions. The rotor 362 is rotating continuously during a balancing operation and the coil 376 is normally energized so that the clutch plate 372 is in engagement with the brake plate 374, as shown in FIGURE 7. However, upon a proper signal from a suitable sensing unit, the coil 376 is deenergized. The spring member 381 then instantly forces the cam 380 to the left so that the clutch plate 372 engages the engagement member 370 of the fly wheel 368. Thus, the cam member 380 rotates with rotation of the fly wheel 368.

Rotation of the cam member 380 causes the yoke 382 to move the plunger or piston 387 upwardly within the chamber 388 as shown in FIGURE 11. Within the passage 392 of the barrel 390 is a projectile 420, which is a portion severed from the wire 406 in a manner discussed below. With movement of the plunger or piston 387 upwardly within the chamber 388 as shown in FIGURE 11, air within the chamber 388 is compressed until the pressure of the air forces the projectile 420 outwardly as the projectile 420 moves within the barrel 390 as shown in FIGURE 12. The plunger or piston 387 thus serves as a fluid compressor means which creates an air pressure within the chamber 388 which forces movement of the projectile 420 in a direction from the barrel 390. The plunger 410 firmly retains the projectile 420 within the passage 391 of the barrel 390 so that a very high pressure of the air within the chamber 388 is required to cause the projectile 420 to move out of the barrel 390. Thus, the projectile 420 moves at a very high velocity out of the barrel 390. The barrel 390 thus serves as a discharge tube. The barrel 390 is so disposed with respect to a rotating rotor to be balanced that the projectile 420 can penetrate into a groove or any other suitable surface of the rotating rotor for balancing thereof.

For purposes of illustration herein, the cam member 380, the cam member 392, and the drum 416 are shown as rotating in a clockwise direction, as shown by an arrow 422 in FIGURE 8. The position and shape of the cam 380 with respect to the shaft 366 and with respect to the yoke 382 causes the piston or plunger 387 to be at the upward end of its stroke within the chamber 388 at the instant that the cam member 380 has been rotated substantially one-half of a revolution by the clutch member 372.

With rotation of the cam 380, the cam 391 and the drum 416 rotate. The groove or channel 414 in the drum 416 causes the plunger 410 to be moved to the right, as shown in FIGURE 10, immediately following the firing of the projectile 420 as the piston 387 reaches the upward end of its stroke. Continued rotation of the cam 380 causes the yoke 382 to carry the piston 387 downwardly within the chamber 388. As the plunger 387 begins to move downwardly, the plunger 410 is quickly retracted to the position thereof, shown in FIGURE 10. After the plunger 410 reaches its position as shown in FIGURE 10, the cam 392, as a result of its relative position with respect to the other rotating members, urges the pin 398 upwardly causing upward movement of the block 396 so that the upper end of the wire 406 is moved into the path of the plunger 410 as the clamping teeth 402 carry the wire 406 upwardly.

When the piston 387 is moving to its normal downward position as shown in FIGURE 10, air may pass into the chamber 388 through the passage 391 of the barrel 390. Air may also pass into the chamber 388 through a passage 428 as best shown in FIGURE 10. The retracted plunger 410 uncovers the passage 428 as shown in FIGURE 10, permitting air to move through the passage 428 and into the chamber 388. Continued rotational movement of the clutch plate 372 with the fly wheel 368 causes the pin 398 to be lowered as the channel 414 of the drum 416 causes the plunger 410 to move to the left. The plunger 410 serves the upper portion of the wire 406 and moves the severed portion of the wire 406 into the passage 391 of the barrel 390 so that the wire portion becomes a projectile, referred to by reference numeral 420. Thus, projectile feed means or insertion means includes the plunger 410 while the barrel 390 serves as a projectile receiver.

The clutch plate 372 carries a stop pin 430 as shown in the lower portion of FIGURE 7 so that the clutch plate 372 always stops at the same position with respect to the brake plate 374. The control element or sensing means which energizes the coil 376 is so energized that the clutch plate 372 revolves only one revolution upon each actuation by the sensing means. Therefore, upon each actuation of the ejector unit 360 by means of any suitable sensing means a projectile is fired and another projectile is severed from the wire 406 and moved into the barrel for a subsequent firing.

It is to be understood that the gas within the chamber 388 and compressed by the piston or plunger 387, may be any suitable gas other than air. Furthermore, any gas used in the chamber 388, including air, may be introduced into the chamber 388 at pressures above atmospheric pressure in order to obtain increased velocity of a projectile fired through the barrel 390. Also, a spark of any suitable type may be introduced into the chamber 388 near the end of the compression stroke of the piston 387 to cause explosive combustion of the gases within the chamber 388 to cause the projectile to travel at a higher velocity than would otherwise be obtainable. It is also to be understood that the mechanism shown in FIGURE 7 may be used to fire a projectile for other purposes than that of balancing and that the projectile for any purpose may be a preformed slug, or ball or the like, not necessarily severed from a strip of material.

Figure 13:
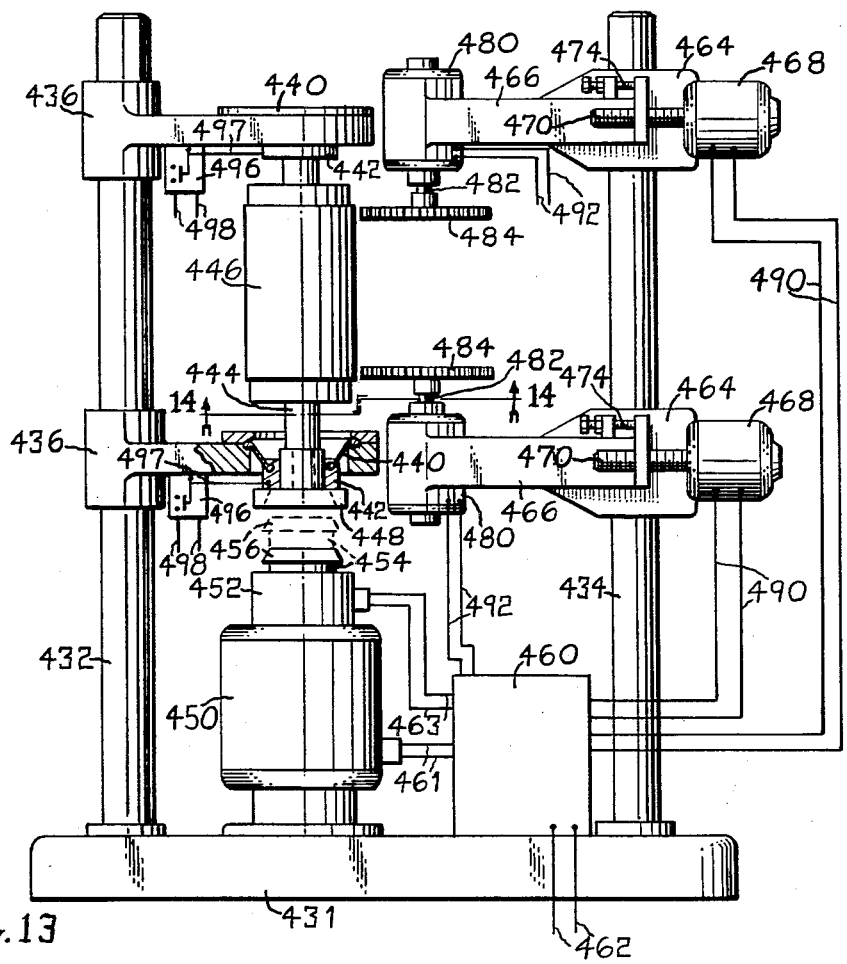
FIGURE 13 is a side elevational view, with parts shown in section, showing another modification of balancing apparatus made according to this invention.
Figure 14:
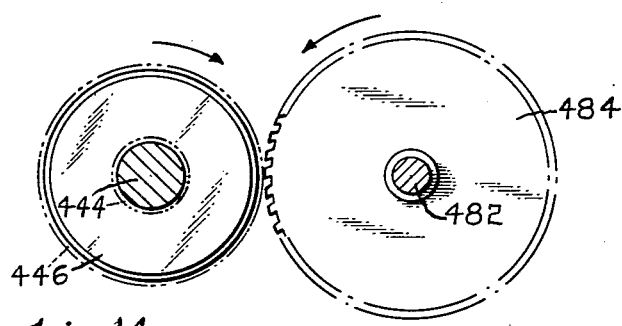
FIGURE 14 is a sectional view, somewhat enlarged, taken substantially on line 14—14 of FIGURE 13.

FIGURES 13 and 14 show another modification of balancing apparatus of this invention. Supported by a base member 431 are post members 432 and 434, which are preferably vertically disposed. Adjustably attached to the post 432 are bracket members 436. Each of the bracket members 436 carries a resilient support member 440. Each of the resilient support members 440 carries a suitable type of bearing member 442 within which is rotatably mounted a shaft 444 of a rotor 446.

The lower end of the shaft 444 is provided with a coupler 448. Shown directly below the coupler 448 is an electric motor 450 which is provided with an actuator element 452 in the upper portion thereof. The motor 450 rotates a shaft 454 which is provided with a coupler 456. The actuator element 452 has means for reciprocally moving the shaft 454 in a vertical direction so that the coupler 456 is engageable with the coupler 448 for rotating the shaft 444.

The motor 450 and the actuator 452 are electrically connected to a control unit 460 by means of leads 461 and 463, respectively. Power supply lines 462 enter the control unit 460.

The post member 434 adjustably carries a plurality of brackets 464. Each bracket 464 supports a horizontally movable carriage 466. Each carriage 466 is adjustably movable by means of an electric motor 468 having a threaded output shaft 470. Preferably, each of the motors 468 includes a gear reduction unit (not shown) so that the output shaft 470 thereof rotates at a slow rate of speed.

An adjustable stop member 474 carried by each bracket 464 limits the amount of horizontal movement of the carriage 466. Attached to each carriage 466 is an electric motor 480 having a shaft 482. Each shaft 482 carries a cutter wheel 484. The electric motors 468 are connected to the control unit 460 by means of leads 490. The electric motors 480 are connected to the control unit 460 by means of leads 492.

A sensing element comprising an electric switch 496, which may be of any suitable type, is carried by each of the brackets 436 and is operably connected by a rod 497 to one of the bearings 442. Each switch 496 is electrically connected to the control unit 460 by means of leads 498.

Operation of the apparatus shown in FIGURES 13 and 14 is as follows: The electric motor 450 rotates the shaft 454. The actuator unit 452 causes movement of the shaft 454 toward the coupler 448 so that the coupler 456 comes into engagement with the coupler 448. After the shaft 444 is rotating the rotor 446 at a desired rate of speed, detection of the lateral movement of the rotor 446 begins. Lateral movement of the rotor 446 is permitted by means of the resilient support members 440. Lateral movement of the rotor 446 indicates out of balance thereof. Lateral movement of the rotor 446 causes movement in the switch members 496 and when a given amount of lateral movement occurs one or more of the switches 496 closes.

Closing of either of the switches 496 causes the control unit 460 to energize weight changer means which comprise the cutter members 484. The motors 468 move the carriers 466 toward the rotor 446 and the motors 480 cause rotation of the cutter members 484. As shown in FIGURE 14, the rotor member 446 and the cutter members 484 operate in such a direction that the cutter members 484 assist in the rotative movement of the rotor 446 when the rotor 446 comes into engagement with either of the cutter members 484.

The control unit 460 causes proper movement of the carrier members 466 to a given position with respect to the rotor 446 so that upon lateral movement of the rotor 446, as shown in FIGURE 14, the rotor 446 engages one or both of the cutter members 484. Upon engagement of the rotor 446 with either of the cutter members 484 weight is removed from the rotor 446. Due to the fact that the heavy side of the rotor naturally comes into engagement with the cutter members 484 during lateral movement of the rotor 446, the weight which is removed from the rotor 446 is from a heavier portion of the rotor 446 so that the rotor 446 is brought into better balance as material is removed therefrom by the cutter members 484 during the balancing operation.

It is to be understood that a rotary cutter member, such as a cutter member 484, may be adjusted and operated at any given position with respect to the rotor 446, without the use of detector or sensing means, so that the rotating rotor 446 engages the cutter member and weight is automatically removed from the heavier portions of the rotor as the rotor 446 engages the cutter member.

If desired, the actuator unit 452 may be retracted after the rotor 446 is brought to a given speed so that rotational movement from the motor 450 does not influence the lateral movement of the rotor 446 during balancing thereof. Also, a flexible type of shaft such as the shaft 282 of FIGURE 1 may be used in the shaft 454. Thus, the apparatus of FIGURE 13 automatically balances the rotor 446 as the rotor 446 laterally moves under unbalanced conditions and engages the cutter members 484.

Thus, it is understood that a balancing apparatus of this invention provides means by which a rotating member is readily, easily, and automatically balanced to any desired degree while the member is rotating at any desired rate. No manual operation is required during the balancing procedure. Thus, the apparatus of this invention is particularly adapted for use in a production line operation.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In balancing apparatus, a rotary motor, cam means connected to the rotary motor for operation thereby, fluid compressor means connected to the cam means for operation thereby, a barrel, injector means operable by the cam means for injecting a projectile into the barrel, there being communication between the compressor means and the barrel so that upon creation of sufficient fluid pressure by the compresor means the projectile is moved at a high velocity through the barrel.

2. A projectile actuator comprising rotary motor means, clutch means connected to the rotary motor means, cam means connected to the clutch means for operation thereby, a projectile receiver, a housing communicating with the receiver, fluid compressor means within the housing and in communication with the projectile receiver and connected to the cam means for operation thereby, injector means operably connected to said cam means for operation thereby for injecting a projectile into said projectile receiver, a projectile in said projectile receiver being urged therefrom when the fluid compressor means creates sufficient pressure within the housing and within the projectile receiver.

3. A projectile actuator comprising rotary motor means, clutch means connected to the rotary motor means, cam means connected to the clutch means for operation thereby, a barrel, a housing having a chamber communicating with the barrel, compressor means within the chamber and connected to the cam means for operation thereby, a projectile in said barrel being forced therefrom when there is sufficient pressure within the chamber, plunger means operably connected to said cam means for operation thereby for injecting a projectile into said barrel, and projectile material feed means operably connected to said cam means for operation thereby, the projectile material feed means introducing projectile material to the injector means.

4. A projectile actuator comprising rotary motor means, a shaft connected to the motor means and rotatable therewith, a first cam member, the first cam member encompassing the shaft and rotatable thereupon, clutch means connecting the cam member to the shaft for rotation therewith, a yoke encompassing the first cam member, guide means attached to the yoke permitting reciprocal lateral movement of the yoke but retaining the yoke against rotation, a plunger attached to the yoke for movement therewith, a barrel having a chamber in communication therewith, said plunger being within said chamber, insertion means for insertion of a projectile into said barrel, a second cam member, the second cam member being connected to the first cam member for rotation therewith, and means connecting the second cam member to the insertion means for operation of the insertion means by the second cam means.

5. Apparatus for balancing a member during rotation thereof comprising sensing means detecting lateral movement of the axis of rotation of the member, the sensing means detecting the instant of time that a heavier portion of the member is disposed at a given position, weight changer means, the weight changer means including weight discharger means, rotary impact means connected to the weight discharge means for operation thereof, rotary motor means, clutch means mechanically connected to the motor means and electrically connected to the sensing means, the clutch means being mechanically connected to the rotary impact means for operation thereof for discharge of weight means.

6. Discharge apparatus comprising weight material receiver means, rotary motor means adapted for continuous operation, actuator means for forcing weight material from the weight material receiver means, the actuator means including reciprocally operable plunger means engageable with the weight material in the weight material receiver means, rotatable engagement means including an impact member engageable with the plunger means, and instantaneously operable clutch means connecting the motor means to the rotatable engagement means so that the engagement means forces instantaneous movement of the plunger means causing instantaneous movement of weight material from the weight material receiver means.

7. Balancing apparatus for correcting the unbalance of a rotating body during rotation thereof comprising weight material receiver means, rotary drive means, actuator means for forcing weight material from the weight material receiver means to the rotating body, rotary cam means operatively connected to the actuator means for operation thereof, clutch means connecting the rotary drive means to the rotary cam means for operation of the rotary cam means by the rotary drive means, and sensing means operable in response to the unbalance of the rotating body and connected to the clutch means for operation thereof the sensing means sensing the position of a heavier portion of the rotating body and causing operation of the clutch means to cause weight material to be forced from the weight material receiver means to a lighter portion of the rotating body.

8. Balancing apparatus for a rotating body during rotation thereof comprising indicator means indicating unbalance of the rotating body, rotary motor means adapted for continuous operation, rotary impact means, rotary clutch means connected to the rotary motor means and engageable with the rotary impact means for rotative movement thereof, the rotary clutch means being connected to the indicator means for operation thereby for engagement with the rotary impact means, rotary cam means adjacent the clutch means and engageable with the clutch means for forcing disengagement thereof from the rotary impact means, weight material container means, plunger means within the weight material container means and operable to force weight material from the weight material container means to the rotating body, the rotary impact means being engageable with the plunger means for operation thereof.

9. Discharge apparatus comprising rotary motor means, a one revolution clutch connected to the motor means, a first cam member connected to the clutch for rotation therewith, a yoke encompassing the first cam member, the yoke being reciprocally movable with rotation of the first cam member, a barrel, fluid compressor means communicating with the barrel and connected to the yoke for operation therewith, projectile feed means adjacent the barrel and communicating therewith, a second cam member attached to the first cam member for rotation therewith, means operably connecting the second cam member to the projectile feed means for operation thereof for moving a projectile into the barrel, the fluid compressor means creating fluid pressure within the barrel for discharging a projectile therefrom.

10. Discharge apparatus comprising rotary motor means, cam means, clutch means connecting the motor means to the cam means, projectile receiver means, projectile actuator means in communication with the projectile receiver means for urging a projectile therefrom, means connecting the cam means to the projectile actuator means for operation of the actuator means, strip material feed means operatively connected to the cam means for operation thereby to force strip material to a position adjacent the projectile receiver means, and strip material cutter means operatively connected to the cam means for operation thereby for cutting a portion of the strip material which is adjacent the projectile receiver means to serve as a projectile, the strip material cutter means also forcing a cut portion of the strip material which is cut thereby from a position adjacent the projectile receiver means into the projectile receiver means.

11. Apparatus for discharging material into a barrel comprising weight receiver means joined to the barrel and in communication therewith, plunger means connected to the weight receiver means for forcing weight material from the weight receiver means into the barrel, impact means engageable with the plunger means, rotary motor means, clutch means connecting the rotary motor means to the impact means so that the impact means is forced in a direction toward the plunger means, and cam means between the clutch means and the impact means causing disconnection of the clutch means from the impact means, inertial forces of the impact means created by the movement thereof by the rotary motor means through the clutch means causing movement of the impact means against the plunger means.

References Cited in the file of this patent

UNITED STATES PATENTS

| | | |
|---|---|---|
| 693,407 | Lobofish | Feb. 18, 1902 |
| 1,249,919 | Doehler | Dec. 11, 1917 |
| 1,347,728 | Wills | Apr. 28, 1920 |
| 1,858,155 | Harris | May 10, 1932 |
| 2,046,327 | Keith | July 7, 1936 |
| 2,320,438 | Keith | June 1, 1943 |
| 2,564,720 | Pre-Genzer | Apr. 21, 1951 |
| 2,731,887 | Sjostrand | Jan. 24, 1956 |
| 2,778,530 | Sillars | Jan. 22, 1957 |
| 2,821,858 | King | Feb. 4, 1958 |
| 2,937,613 | Larsh | May 24, 1960 |